E. S. RUSH.

TIMER.

APPLICATION FILED OCT. 12, 1920.

Reissued May 17, 1921. 15,107.

INVENTOR

ESTOL SENN RUSH

BY Graham + Dunn

HIS ATTORNEYS

UNITED STATES PATENT OFFICE.

ESTOL SENN RUSH, OF LOS ANGELES, CALIFORNIA.

TIMER.

15,107. Specification of Reissued Letters Patent. Reissued May 17, 1921.

Original No. 1,332,637, dated March 2, 1920, Serial No. 294,921, filed May 5, 1919. Application for reissue filed October 12, 1920. Serial No. 416,553.

*To all whom it may concern:*

Be it known that I, ESTOL SENN RUSH, a citizen of the United States, residing at Los Angeles, in the county of Los Angeles and State of California, have invented new and useful Improvements in Timers, of which the following is a specification.

My object is to make a timer for internal combustion engines and my invention consists of the novel features herein shown, described and claimed.

Further objects and advantages will be made evident hereinafter.

Referring to the drawings which are for illustrative purposes only,

Figure 1:
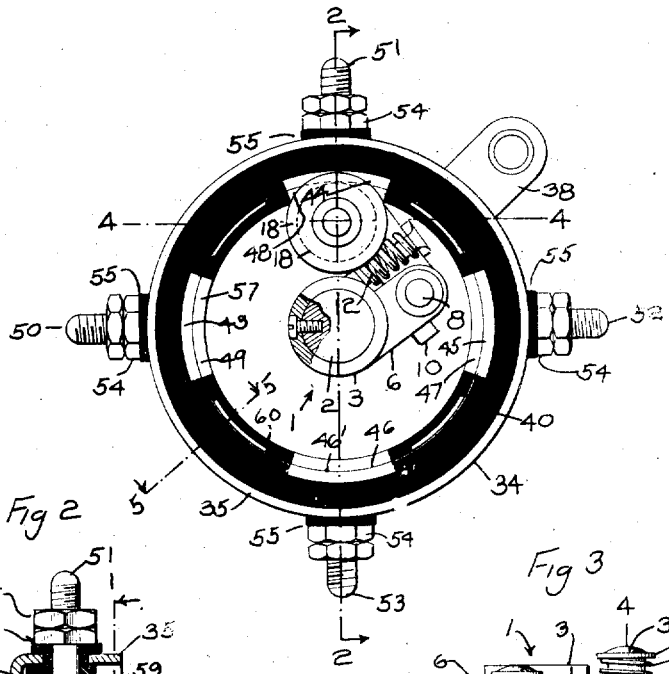
Figure 1 is a section on a plane indicated by the line 1—1 in Fig. 2.
Figure 2:
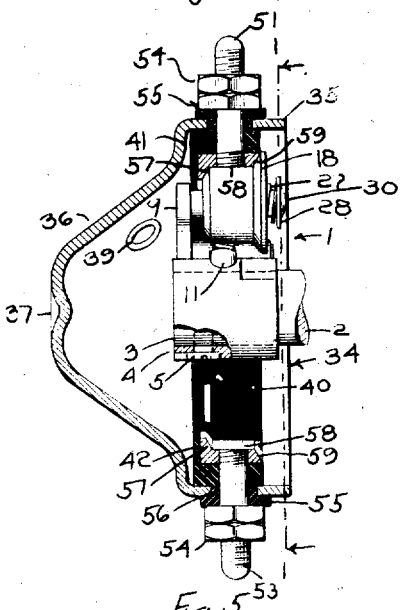
Fig. 2 is a section on a plane indicated by the line 2—2 of Fig. 1.
Figure 3:
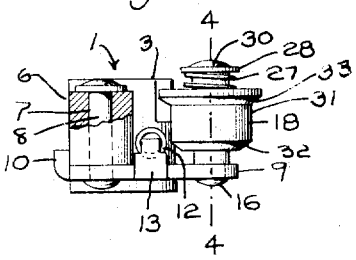
Fig. 3 is a side elevation of the traveling member carried by the cam shaft.
Figure 4:
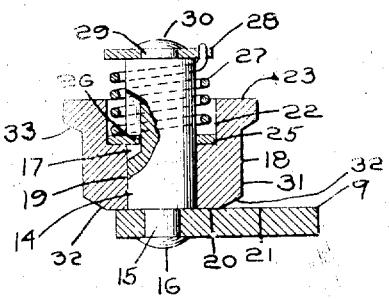
Fig. 4 is a sectional detail through the contact roller mounted on the traveling member, the view being taken on a plane indicated by the line 4—4 of Fig. 1.
Figure 5:
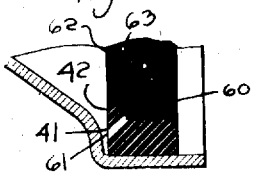
Fig. 5 is an enlarged fragmentary sectional detail showing the drain for oil and dirt, the view being taken on the line 5—5 of Fig. 1 and looking in the direction indicated by the arrow.

The traveling member 1 is rigidly mounted upon the cam shaft 2. The details of the traveling member 1 are as follows:

The bearing 3 fits tightly upon the cam shaft 2 and has a slot 4 extending from its outer end and a screw 5 is inserted through the slot 4 into the cam shaft 2 to hold the bearing 3 in place. A lug 6 extends from one side of the bearing 3 and has a bore 7 parallel with the cam shaft 2.

A pivot pin 8 is rotatably mounted in the bore 7. The lug 6 is shorter than the bearing 3 and a pivoted plate 9 fits against the outer end of the lug 6 and the pivot pin 8 extends through the pivoted plate 9 and is rigidly fixed in the plate.

A stop 10 is bent upwardly from one end of the pivoted plate 9 to engage the side of the lug 6 to limit the movement of the plate 9 in one direction.

A spring seat 11 is formed upon the bearing 3 at the opposite side of the lug 6, from the stop 10. An expansive coil spring 12 fits against the spring seat 11. A second spring seat 13 is bent upwardly from the central portion of the pivoted plate 9 to support the outer end of the spring 12, the tension of the spring 12 being exerted to throw the pivoted plate 9 outwardly from the cam shaft 2.

A spindle 14 fits against the pivoted plate 9 and has a reduced portion 15 extending through the plate 9 and riveted to form a head 16. A key slot 17 is formed in one side of the spindle 14. A contact roller 18 is rotatably mounted upon the spindle 14 and fits endwise against the pivoted plate 9.

A bore 19 through the roller 18 fits closely upon the spindle 14 and the end face 20 from which the bore 19 is formed fits against the inner face 21 of the pivoted plate 9.

An enlarged bore 22 extends from the bore 19 to the outer end face 23 of the roller. A spring seat 25 fits loosely upon the spindle 14 and loosely in the enlarged bore 22 and has a tongue forming a key 26 fitting loosely in the key slot 17 so as to hold the spring seat 25 from rotating on the spindle 14 and at the same time allow the roller 18 to rotate freely upon the spindle.

An expansive coil spring 27 fits around the spindle 14 in the enlarged bore 22, the inner end of the spring 27 being attached to the inner spring seat 25 and the outer end of the spring 27 being attached to the outer spring seat 28. The outer spring seat 28 is in the form of a washer fitting against the outer end of the spindle 14, there being a neck 29 extending from the end of the spindle 14 through the washer and riveted to form a head 30 to hold the washer in place. The spring seat 28 is large enough to support the outer end of the spring 27 and small enough to pass freely into the bore 22 so that the roller 18 may move endwise upon the spindle. The tension of the spring is exerted to move the roller 18 toward the pivoted plate 9.

The contact roller 18 has a straight central annular periphery 31, a bevel annular periphery 32 extending inwardly from the outer end of the periphery 31 and a bevel annular periphery 33 extending outwardly from the inner end of the periphery 31.

The traveling member 1 operates in a stationary member 34. The details of the stationary member 34 are as follows:

The casing is pressed from heavy sheet metal and comprises a straight annular band portion 35 and a dished web 36 having a central dent 37. An operating arm 38 extends outwardly from the web 36 and an oil hole 39 is formed through the web.

An insulating bearing ring 40 is preferably formed of hard fiber. The ring 40 fits tightly within the band portion 35 and is spaced from the outer edge of the web 36 to form the annular drain trough 41.

A bevel flange 42 extends inwardly from the ring 40 at the outer side, that is next to the drain trough 41. Dovetail recesses 43, 44, 45 and 46 are formed across the ring 40 from its inner face and extend part way into the flange 42.

Dovetail contact plates 46′, 47, 48 and 49 are inserted endwise into the recesses 43, 44, 45 and 46 and the binding posts 50, 51, 52 and 53 are inserted through the band 35, through the ring 40 and tapped into the contact plates 46′, 47, 48 and 49 and nuts 54 are applied to the outer ends of the binding posts to hold the posts in place and to hold the contact plates in place.

Insulation washers 55 are placed under the nuts 54 to fit against the band 35 and the holes 56 in the band 35 are large enough to insulate the band from the posts. The contact plates 46′, 47, 48 and 49 have beveled faces 57 matching with the beveled flange 42 and adapted to be engaged by the bevel annular periphery 32 of the roller 18 and the contact plates have straight faces 58 adapted to be engaged by the straight periphery 31 of the contact roller 18 and beveled edges 59 adapted to be engaged by the beveled annular periphery 33 of the contact roller, so that when the cam shaft 2 is operating and the traveling member 1 moves within the stationary member 34 there is a straight line contact between the contact roller 18 and the contact plates 46′, 47, 48 and 49, said straight line being in a plane radial to the axis of the roller 18 and between the beveled periphery 33 and the beveled edge 59 and between the straight periphery 31 and the straight face 58 and between the beveled periphery 32 and the beveled face 63.

The face 60 of the ring 40 is beveled to match the bevel 59 and inclined slots 61 are formed from the face 62 and the face 63 between the contact plates to discharge the grease, oil and dirt outwardly to the annular trough 41. The parts are made up and all finished together to form the bevel face 60, the straight face 62 and the bevel face 63 upon the flange 42 in the ring 40.

The same operation forms the bevels 57 and 59 and the straight face 58 of each contact plate so that the contact roller 18 has a perfectly smooth track. The contact between the roller 18 and the contact plates is actually a line thereby making it possible to accurately time the make and break.

My invention involves broadly the conception of a dual contact roller, that is a roller which makes contact on its periphery by what may be termed radial pressure and which in addition makes contact on a secondary contact face by what may be termed axial pressure, that is pressure along the axis of rotation of the roller. I find that the best results are obtained when the roller is made cylindrical and the secondary contact face is made conical as shown in drawings. In the drawings two secondary contact faces are shown on the roller at 32 and 33. Since the diameter of the periphery of the roller and the mean diameter of the secondary contact face are different, it follows that either the secondary contact must slip on the track, *i. e.* the ring 40 and the contact plates 46′, 47, 48 and 49. In practice the tension of the springs 12 and 27 is so proportioned that both the secondary contacts and the periphery of the roller slip on the track a little thus producing a rubbing action which keeps the roller and track bright and tends to wear away irregularities caused by burning or arcing. By the dual contact a greater wearing and arcing surface is provided.

The dual contact also provides two or more alternate or multiple current paths. If for example the periphery of the roller which makes a line contact with the track encounters a bit of dirt or is thrown out of contact with the track for any reason, this interrupts the circuit at the periphery of the roller and would cause an arc, with its consequent burning or pitting, were it not for the secondary contacts due to the spring 27.

The periphery of the roller can entirely leave the track without opening the circuit at 32 or 33 and the arcing is thus greatly reduced with consequent longer life of both roller and track. I have found that where my roller is installed in timers having a badly pitted and roughened track that they soon smooth this track out and reduce the pitting.

My invention further involves a novel construction of roller in which the arcing at the bore of the roller is eliminated.

In the standard form of Ford timer in which a purely cylindrical roller is used, there is a very rapid enlargement of the bore and reduction of the pin on which it turns due to the fact that current must be conducted through the oil film surrounding the pin. In my timer, no current need flow through this oil film, the current flowing from the roller 18 to the washer 25 and through the spring 27 or the key 26 to the pin. As the pin or spindle 14 the washer 25 and the spring 27 are stationary with relation to each other or at most have a very slight and intermittent mutual movement the chances of arcing are very remote.

The sliding contact between the washer 25 and the roller 18 is maintained at all times by the spring 27 and this contact is constantly subject to a rubbing or wearing action tending to keep it bright and clean. As a consequence, the roller 18 does not have its bore nor the spindle 14 have its periphery burned away by arcing.

The spring 27 and the washer 25 also act as a brake on the roller 18 somewhat accentuating the slip of the periphery of the roller 18 on the track and further promoting and insuring the rubbing or wiping action necessary to a clean track and roller.

It should be noted further that the periphery 31 of the roller makes a line contact with the track as do the coned or beveled surfaces 32 and 33. Further the three separate lines of contact *i. e.* on the periphery 31 and the conical beveled peripheries 32 and 33 are all in the same plane which also contains the axis of the roller 18 the shaft 2 and the track. Perfect timing is thus insured as all three lines of contact break the circuit at practically the same time.

I claim:

1. In a timer a traveling member comprising a bearing adapted to fit upon a cam shaft, a lug extending from one side of the bearing and having a bore parallel with the cam shaft, a pivot pin rotatably mounted in the bore, a pivoted plate fitting against the outer end of the lug and fixed upon the pivot pin, a stop bent upwardly from one end of the plate to engage the side of the lug, a spring seat formed upon the bearing at the opposite side of the lug from the stop, an expansive coil spring fitting against the spring seat, a second spring seat bent upwardly from the central portion of the pivoted plate to support the outer end of the spring, the tension of the spring being exerted to throw the pivoted plate outwardly from the cam shaft, a spindle fixed in the free end of the pivoted plate parallel with the cam shaft, and a contact roller mounted upon the spindle.

2. In a timer a traveling member comprising a bearing adapted to fit upon a cam shaft, a lug extending from one side of the bearing, a pivoted plate connected to the lug, a spindle fixed in the free end of the plate, and a contact roller mounted upon the spindle, said contact roller comprising a body having a bore in which the spindle fits and an end face fitting against the pivoted plate and having an enlarged bore extending from the first bore to the other end face of the body, a spring seat fitting loosely upon the spindle and loosely in the enlarged bore and slidingly splined to the spindle, an expansive coil spring fitting around the spindle in the enlarged bore against the spring seat, and an outer spring seat fixed upon the outer end of the spindle against the spring, and said body having a straight central periphery, a beveled periphery extending inwardly from the outer end of the straight periphery, and a beveled periphery extending outwardly from the inner end of the straight periphery.

3. In a timer a stationary member comprising a casing forming a straight annular band portion and a dished web extending from one edge of the band, an insulating ring fitting tightly in the band and spaced from the web to form a trough and having a beveled flange extending inwardly at the edge adjacent the web, there being drain openings through the insulation leading to the trough and there being dove tail recesses formed across the ring from its inner face and extending into the beveled flange, dovetail contact plates inserted endwise into the recesses and binding posts inserted through the band, through the insulating ring, and tapped into the contact plates.

4. In a timer a stationary member comprising a casing forming a straight annular band portion and a dished web extending from one edge of the band, an insulating bearing ring fitting tightly in the band and spaced from the web to form a trough and having a beveled flange extending inwardly at the edge adjacent the web, there being drain openings through the insulation leading to the trough and there being dove tail recesses formed across the ring from its inner face and extending into the beveled flange, dovetail contact plates inserted endwise into the recesses and binding posts inserted through the band, through the insulating ring, and tapped into the contact plates, said insulating ring and contact plates being finished to form a straight annular inner face, a beveled annular inner face extending inwardly from one side of the straight face and a beveled annular face extending outwardly from the other side of the straight face.

5. In a timer a traveling member having a contact roller spring pressed in one direction longitudinal of its axis, and a stationary member having contact plates against which the roller fits, said contact plates having central straight annular inner faces, beveled faces extending inwardly at one side of the straight faces and beveled faces extending outwardly at the other side of the straight faces, and said roller having a straight central periphery to fit the straight portions of the contact plates and a beveled periphery at one end to fit the inwardly extending beveled contact faces of the plates, and a beveled periphery at the other end to fit the outwardly extending beveled faces of the contact plates, so that the roller contacts with a contact plate upon a line parallel with its axis.

6. In a timer having an annular track composed of alternating sections of insulating and conducting material; the combination of members rotating inside and about the axis of said track; a roller carried on said members, said roller having a secondary contact face; and means for forcing said roller radially, to cause its periphery to make contact with said track, and axially, to cause its secondary contact face to make contact with a similarly beveled face on said track.

7. In a timer having an annular track composed of alternating sections of insulating and conducting material; the combination of members rotating inside and about the axis of said track; a roller carried on said members, said roller having a secondary contact face; a spring forcing said roller radially against said track; and a spring forcing said secondary contact axially against said track.

8. In a timer having an annular track composed of alternating sections of insulating and conducting material; the combination of a member rotating inside of and about the axis of said track; a pivot pin carried by said member; a swinging arm pivoted on said pivot pin; a spindle carried on the free end of said swinging arm and having its axis substantially parallel to the axis of said track; a roller mounted to turn and slide on said spindle and having a conical secondary contact face; means for forcing said spindle radially; and means for forcing said roller axially on said spindle.

9. In a timer having an annular track composed of alternating sections of insulating and conducting material; the combination of a member rotating inside of and about the axis of said track; a pivot pin carried by said member; a swinging arm pivoted on said pivot pin; a spindle carried on the free end of said swinging arm and having its axis substantially parallel to the axis of said track; a roller mounted to turn and slide on said spindle and having a conical secondary contact face; a spring forcing said spindle toward said track; and a spring forcing said secondary contact face against a similarly beveled surface on said track.

10. In a timer having a track formed of alternate sections of conducting and insulating material in the form of an annular ring; the combination of a shaft at the axis of said ring; members secured to and rotating with said shaft; a spindle parallel to said shaft carried by said members; a roller on said shaft having a conical surface pressing against one end of said ring which is also coned; and a spring for so pressing said roller along the axis of said spindle.

11. In a timer an annular insulating ring; contacts carried by said ring; a shaft on the axis of said ring; a spindle carried on said shaft; a roller turning on said spindle in contact with said contacts; and a spring forcing said roller axially on said spindle against said insulating ring and contacts.

12. In a timer a spindle; a roller turning on said spindle; a washer on said spindle; means for preventing the rotation of said washer and at the same time allowing it to slide axially on said spindle; and a spring pressing said washer axially of said spindle against said roller.

13. In a timer a spindle; a roller turning on said spindle; a washer on said spindle; means for preventing the rotation of said washer and at the same time allowing it to slide axially on said spindle; a compression spring surrounding said spindle, at one side of said roller, one end of said spring pressing against said washer; and means on said spindle forming a bearing for the other end of said spring.

14. In a timer, a pivoted plate; a spindle secured to said plate; a roller on said spindle adjacent to said plate; a washer on said spindle adjacent to said roller on the end away from said pivoted plate; means for preventing said washer from turning on said spindle; a compression spring on said spindle pressing said washer against said roller; and means on the end of said spindle for taking the thrust of said spring.

15. In a timer having a track formed of alternate sections of conducting and insulating material in the form of a ring; a roller inside said ring; members fixed to a shaft at the axis of said ring; a spindle carried by said members on which said roller turns; means for forcing said roller against said ring; and friction means for resisting the turning of said roller on said spindle.

16. In a timer having a track formed of alternate sections of conducting and insulating material in the form of a ring; a roller inside said ring; members fixed to a shaft of the axis of said ring; a spindle carried by said members on which said roller turns; means for forcing said roller against said ring; and a friction device pressing against said roller for retarding its rotation on said spindle.

17. In a timer having a track formed of alternate sections of conducting and insulating material in the form of a ring; a roller inside said ring; members fixed to a shaft of the axis of said ring; a spindle carried by said members on which said roller turns; means for forcing said roller against said ring; a friction member in contact with said roller; and elastic means for pressing said friction member against said roller.

In testimony whereof I have hereunto subscribed my name at Los Angeles, California, this 5th day of October, 1920.

ESTOL SENN RUSH.